3,340,277
PHENYL-CHROMENES
Richard William James Carney, Murray Hill, and William Laszlo Bencze, New Providence, N.J., assignors to Ciba Corporation, New York, N.Y., a corporation of Delaware
No Drawing. Filed June 24, 1964, Ser. No. 377,515
5 Claims. (Cl. 260—345.2)

ABSTRACT OF THE DISCLOSURE

Compounds of the formula

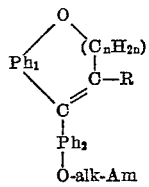

$Ph_1$=a 1,2-phenylene
$Ph_2$=a phenylene
R=H or alkyl
Alk=lower alkylene
Am=tert. amino
n=0–2 their dihydro derivatives, N-oxides, quaternaries and salts of these compounds, e.g. the 4-[4-(2-diethylaminoethoxy)-phenyl]-2H-chromene hydrochloride, exhibit antifungal, antibacterial and taeniacidal effects.

---

The present invention concerns chroman and chromene compounds. More particularly, it relates to compounds having one of the formulae

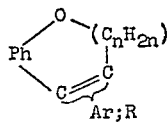 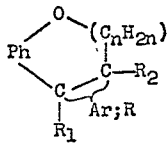

in which Ph is a 1,2-phenylene radical, Ar is a monocyclic carbocyclic aryl group substituted by N-substituted amino-lower alkyloxy, in which N-substituted amino is separated from oxy by at least two carbon atoms, R is hydrogen or an aliphatic radical, each of the groups $R_1$ and $R_2$ is hydrogen or lower alkyl, and in the group of the formula —$(C_nH_{2n})$—, which separates the oxygen from the carbon atom of the double bond or from the carbon atom substituted by $R_2$ by at most two carbon atoms, the letter n is an integer from 0 to 4, salts, N-oxides, salts of N-oxides or quaternary ammonium compounds thereof, as well as procedure for the preparation of such compounds.

The 1,2-phenylene (o-phenylene) radical is unsubstituted or may be substituted by one or more than one of the same or of different substituents attached to any of the four positions available for substitution. Substituents are primarily lower alkyl, e.g. methyl, ethyl, n-propyl, isopropyl and the like, etherified hydroxyl, especially lower alkoxy, e.g. methoxy, ethoxy, n-propyloxy, isopropyloxy, n-butyloxy and the like, as well as lower alkenyloxy, e.g. allyloxy and the like, or lower alkylenedioxy, e.g. methylenedioxy and the like, or esterified hydroxyl, particularly halogeno (representing hydroxyl esterified by a hydrohalic acid), e.g. fluoro, chloro, bromo and the like, as well as nitro, amino, or N-substituted amino, such as N,N-di-lower alkylamino, e.g. N,N-dimethylamino, N,N-diethylamino and the like, trifluoromethyl, acyl, such as lower alkanoyl, e.g. acetyl, propionyl, pivalyl and the like, benzoyl, pyridoyl, e.g. nicotinoyl and the like, or any other suitable substituent. The 1,2-phenylene group Ph in the above formula is primarily 1,2-phenylene, (lower alkyl)-1,2-phenylene, (etherified hydroxy)-1,2-phenylene, especially (lower alkoxy)-1,2-phenylene, as well as (lower alkenyloxy)-1,2-phenylene or (lower alkylenedioxy)-1,2-phenylene and the like, or (esterified hydroxy)-1,2-phenylene, particularly (halogeno)-1,2-phenylene and the like, as well as (nitro)-1,2-phenylene, (amino-1,2-phenylene, (N-substituted amino) - 1,2 - phenylene, such as (N,N-di-lower alkyl-amino) 1,2-phenylene and the like, (trifluoromethyl)-1,2-phenylene, (acyl)-1,2-phenylene, such as (lower alkanoyl)-1,2-phenylene, (benzoyl)-1,2-phenylene, (pyridoyl)-1,2-phenylene and the like, or any other suitably substituted 1,2-phenylene group.

The monocyclic carbocyclic aryl group Ar has one or more than one N-substituted amino-lower alkyl-oxy substituent, which may substitute any of the positions available for substitution; preferably, an N-substituted amino-lower alkyl-oxy group substitutes the 4-position. Such substituent is represented by the group of the formula —O—$(C_mH_{2m})$—Am in which Am is an N-substituted amino group, and the group of the formula —$(C_mH_{2m})$— stands for lower alkylene separating the N-substituted amino group Am from the oxygen by at least two carbon atoms. The group of the formula —$(C_mH_{2m})$— stands preferably for lower alkylene having from two to three carbon atoms (i.e. the letter m stands primarily for an integer from two to three) and separating the N-substituted amino group Am from the oxygen atom by two to three carbon atoms. Such alkylene group is primarily 1,2-ethylene, 1-methyl-1,2-ethylene, 2-methyl-1,2-ethylene or 1,3-propylene, but may also be 1,3-butylene, 2,3-butylene, 3,4-butylene, 1,4-butylene, 1,4-pentylene, 1,5-pentylene, 1,5-hexylene, 1,6-hexylene, 1,7-heptylene and the like.

An N-substituted amino group, such as the group Am in the above formula, is an N-monosubstituted amino group or, more especially, an N,N-di-substituted amino, in which the substituents have preferably from one to ten carbon atoms. The latter are, for example, aliphatic radicals, especially lower alkyl, e.g. methyl, ethyl, propyl, isopropyl, butyl, isobutyl, secondary butyl, pentyl, neopentyl and the like, as well as lower alkenyl, cyclopentyl, cyclohexyl and the like, cycloaliphatic-radicals, such as cycloalkyl having from three to eight, preferably five or six, ring carbon atoms, e.g. cyclopentyl, cylohexyl and the like, cycloaliphatic-aliphatic radicals, such as cycloalkyl-lower alkyl, in which cycloalkyl has from three to eight, preferably five or six, ring carbon atoms, e.g. cyclopentylmethyl, 2-cyclohexylethyl and the like, carbocyclic aryl radicals, such as monocyclic carbocyclic aryl, e.g. phenyl and the like, carbocyclic aryl-aliphatic radicals, such as monocyclic carbocyclic aryl-lower alkyl, for example, phenyl-lower alkyl, e.g. benzyl, 1-phenylethyl, 2-phenylethyl and the like, or any other equivalent radical, such as one of the above substituents, particularly lower alkyl, substituted by functional groups, such as hydroxyl, lower alkoxy, e.g. methoxy, ethoxy and the like, lower alkyl-mercapto, e.g. methylmercapto, ethylmercapto and the like, or any other suitable functional group, such as hydroxy-lower alkyl, e.g. 2-hydroxyethyl and the like.

N-monosubstituted amino groups are primarily N-lower alkyl-amino, e.g. N-methylamino, N-ethylamino and the like, as well as N-cycloalkyl-amino, in which cycloalkyl has from three to eight, preferably from five to six, ring carbon atoms, e.g. N-cyclopentylamino, N-cyclohexyl-amino and the like, N-phenyl-lower alkyl-amino, e.g. N- benzylamino, N-(2-phenylethyl)-amino and the like, N-hydroxy-lower alkyl-amino, in which hydroxyl is separated from the nitrogen by at least two carbon atoms, e.g. 2-hydroxy-ethylamino and the like.

N,N-di-substituted amino groups representing the N-substituted amino group Am are primarily N,N-di-lower alkyl-amino, e.g. N,N-dimethylamino, N-methyl-N-ethyl-amino, N,N-diethylamino, N,N-di-n-propylamino, N,N-di-isopropylamino, N,N-di-n-butylamino and the like, as well as N-cycloalkyl-N-lower alkyl amino, e.g. N-cyclopentyl-N-methyl-amino, N-cyclohexyl-N-methyl-amino, N-cyclohexyl-N-ethyl-amino and the like, or N-lower alkyl-N-phenyl-lower alkyl-amino, e.g. N-benzyl-N-methyl-amino, N-benzyl-N-ethyl-amino, N-ethyl-N - (1 - phenylethyl)-amino, N-methyl-N-(2-phenylethyl)-amino and the like, or any other equivalent N,N-di-substituted amino group, N-hydroxy-lower alkyl-N-lower alkyl-amino, in which hydroxyl is separated from the amino-nitrogen by at least two, preferably by two to three, carbon atoms, e.g. N-(2-hydroxyethyl)-N-methyl-amino and the like, N,N-di-hydoxy-lower alkylamino, in which hydroxyl is separated from the amino-nitrogen by at least two, preferably by two to three, carbon atoms, e.g. N,N-di-(2-hydroxyethyl)-amino and the like.

The N-susbtituted amino group, such as the group Am in the above formula, may also represent an N,N-disubstituted amino group, in which the two substituents are taken together and form a di-valent radical, such as a 1-N,N-alkylene-imino group, in which alkylene has from four to eight carbon atoms, e.g. 1-pyrrolidino, 2-methyl-1-pyrrolidino, 1-piperidino, 2-methyl - 1 - piperidino, 4-methyl-1-piperidino, 1-N,N-(1,6-hexylene)-imino, 1-N,N-(1,7-heptylene)-imino and the like, a 1-N,N-aza-alkylene-imino group, in which alkylene has from four to six carbon atoms, and the two nitrogen atoms are separated by at least two carbon atoms, particularly a 1-N,N-(N-lower alkyl-aza-alkylene)-imino group, in which alkylene has from four to six carbon atoms, and the two nitrogen atoms are separated by at least two carbon atoms, such as 1-piperazino or, particularly, 4-lower alkyl-1-piperazino, e.g. 4-methyl-1-piperazino, 4-ethyl-1-piperazino and the like, as well as 1-N,N-(3-aza-3-lower alkyl-1,6-hexylene)-imino, e.g. 1-N,N-(3-aza-3-methyl-1,6-hexylene) - imino and the like, or 1-N,N-(4-aza-4-lower alkyl-1,7-heptylene)-imino, e.g. 1-N,N-(4-aza-4-methyl-1,7 - heptylene)-imino and the like, or a 1-N,N-oxa-alkylene group, in which alkylene has preferably four carbon atoms, and the oxygen atom is separated from the nitrogen atom by two carbon atoms, such as a 4-morpholino group, e.g. 4-morpholino, 3-methyl-4-morpholino and the like, or a 1-N,N-thia-alkylene-imino group, in which alkylene has preferably four carbon atoms, and the sulfur atom is separated from the nitrogen by two carbon atoms, such as a 4-thiamorpholino group, e.g. 4-thiamorpholino and the like, or any other equivalent N,N-disubstituted amino group.

In the N-substituted amino-lower alkyl-oxy group, the lower alkyl portion, either partially or in toto, may form part of a saturated heterocyclic ring system, the N-substituted amino group Am being a ring member and being separated from the oxy group by at least two carbon atoms. Such N-substituted amino-lower alkyl groups are for example, 1-methyl-2-piperidyl-methyl, 1-methyl - 2-piepridyl-2-ethyl, 1-methyl-3-piperidyl-methyl, 1-ethyl-4-piperidyl, 1-methyl-3-pyrrolidyl-methyl and the like.

Apart from being substituted by N-substituted amino-lower alkyl-oxy, the monocyclic carbocyclic aryl group Ar may have one or more than one additional substituent, which may be attached to any of the positions available for substitution. Such substituents are lower alkyl, halogeno, or trifluoromethyl, such as one of those subsituting the 1,2-phenylene group Ph. As mentioned above, the N-substituted amino-lower alkyl-oxy-substituted monocyclic carbocyclic aryl group Ar may have more than one N-substituted amino-lower alkyl-oxy group of the formula —O—$(C_mH_{2m})$—Am, in which Am and the group of the formula —$(C_mH_{2m})$— have the previously-given meaning.

The group R primarily hydrogen, but may also stand for an aliphatic radical, partciularly lower alkyl, e.g. methyl, ethyl, n-propyl, isopropyl and the like.

Each of the groups $R_1$ and $R_2$ is primarily hydrogen, but may also represent lower alkyl, e.g. methyl, ethyl, n-propyl, isopropyl, n-butyl and the like.

The group of the formula —$(C_nH_{2n})$—, in which the letter $n$ is an integer from 0 to 4, is either a direct bond between the oxygen and the carbon atom of the double bond or the carbon atom substituted by $R_2$, or a lower alkylene radical separating the oxygen from that carbon atom by at most two carbon atoms. Such lower alkylene radical is above all methylene, as well as 1,2-ethylene, but may also be 1,1-ethylene, 1-methyl-1,2 - ethylene, 1,1-propylene, 1,1-butylene, 1,1-isobutylene and the like. The compounds of this invention have, therefore, the 2,3-dihydrobenzofuran (or coumaran) ring system, the chroman ring system or the 2,3,4,5-tetrahydro-1-benzoxepin (or homochroman) ring system.

Salts of the compounds of this invention are acid addition salts, such as pharmaceutically acceptable acid addition salts with inorganic acids, e.g. hydrochloric, hydrobromic, sulfuric, phosphoric acids and the like, or organic acids, such as organic carboxylic acids, e.g. acetic, propionic, pivalic, glycolic, lactic, malonic, succinic, maleic, hydroxy-maleic, malic, tartaric, citric, benzoic, salicylic, 2-acetoxybenzoic, nicotinic, isonicotinic acid and the like, or organic sulfonic acids, e.g. methane sulfonic, ethane sulfonic, ethane 1,2-disulfonic, 2-hydroxyethane sulfonic, p-toluene sulfonic, naphthalene 2-sulfonic acid and the like. Other addition salts with acids may be useful as intermediates, for example, in the preparation of pharmaceutically acceptable acid addition salts or in the purification of the free compounds, as well as for identification or characterization purposes. Salts, which are prepared primarily for the latter, are, for example, those with certain inorganic acids, e.g. perchloric acid and the like, with acidic organic nitro compounds, e.g. picric picrolonic, flavianic acid and the like, or with metal complex acids, e.g. phosphotungstic, phosphomolybdic, chloroplatinic, Reinecke acid and the like. Mono- or poly-salts may be formed depending on the number of salt-forming groups and/or the conditions used for the salt formation.

Also included within the scope of the present invention are the N-oxides of the aforementioned compounds, as well as the acid addition salts of such N-oxides, for example, the pharmacetically acceptable, non-toxic acid addition salts of N-oxides, such as those with the above-mentioned acids.

Quaternary ammonium derivatives of the compounds of this invention are those formed with reactive esters of alcohols and strong inorganic or organic acids, particularly those with lower aliphatic halides, sulfates, or organic sulfonates, such as lower alkyl halides, e.g. methyl, ethyl, n-propyl or isopropyl chloride, bromide, iodide and the like, di-lower alkyl sulfates, e.g. di-methyl sulfate, diethyl sulfate and the like, lower alkyl lower alkane sulfonates, e.g. ethyl or methyl methane sulfonate, ethane sulfonate and the like, lower alkyl lower hydroxy-alkane sulfonates, e.g. methyl 2-hydroxy-ethane sulfonate and the like, or lower alkyl monocyclic carbocyclic aryl sulfonates, e.g. methyl p-toluene sulfonate, ethyl p-toluene sulfonate and the like, as well as those with carbocyclic arylaliphatic halides, such as phenyl-lower alkyl halides, e.g. benzyl, 1-phenylethyl or 2-phenylethyl chloride, bromide or iodide and the like. Also included as quaternary ammonium compounds are the corresponding quaternary ammonium hydroxides, and the quaternary ammonium salts with acids other than hydrohalic, sulfuric or organic sulfonic acids, particularly those with the organic carboxylic acids mentioned hereinabove.

The compounds of this invention have anti-microbial effects, particularly antifungal properties, for example, against fungi causing superficial dermatophytoses, such as *Trichophyton mentagrophytes, Trichophyton gallinae, Trichophyton interdigitale, Microsporum audouini, Microsporum canis, Microsporum gypseum* and the like, as well as against fungi causing chronic infections of the skin and the subcutaneous tissue, such as *Sporotrichium schenkii* and the like, or fungi causing deep-seated systemic mycoses (yeasts), such as *Candida albicans, Cryptococcus neoformans, Histoplasma capsulatum* and the like. They also show effects against antinomyces, such as *Nocardia asteroides* and the like, against bacteria, such as gram-positive bacteria, for example, *Diplococcus pneumoniae, Staphylococcus aureus* and the like, or gram-negative bacteria, for example, *Escherichia coli, Pseudomonas aeruginosa* and the like. They are, therefore, useful in the treatment of microbial infections caused, for example, by fungi, as well as actinomyces, bacteria and protozoa of the above type.

Compounds of this invention, especially those with more than one N-substituted amino-lower alkoxy group substituting Ar, have taeniacidal (anti-tapeworm) properties, and are, therefore, useful as taeniacides in the treatment of tapeworm infections, caused, for example, by *Hymenolepas nana, Dypilidium canium, Taenia pisiformis* and the like.

Particularly useful are the compounds having the following formulae:

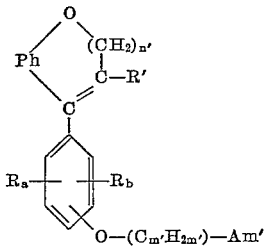

and

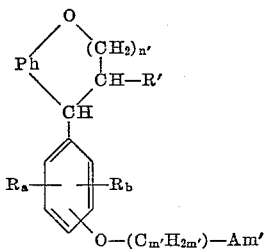

in which Ph' stands primarily for 1,2-phenylene, (lower alkyl)-1,2-phenylene, (lower alkoxy)-1,2-phenylene, or (halogeno)-1,2-phenylene, R' is hydrogen or lower alkyl, the letter $n'$ stands for one of the integers from 0 to 2, particularly for 1, Am' stands for N,N-di-lower alkyl-amino, N,N-alkylene-imino, in which alkylene has preferably from four to seven carbon atoms, 4-morpholino or 4-lower alkyl-1-piperazino, the group of the formula —($C_{m'}H_{2m'}$)— stands for alkylene having from two to three, preferably two, carbon atoms (i.e. the letter $m'$ stands for one of the integers 2 and 3, preferably for the integer 2), and separating the group Am' from the oxygen atom by two to three, preferably by two, carbon atoms, and each of the groups $R_a$ and $R_b$ is hydrogen, halogeno, especially chloro, or the group of the formula —O—($C_{m'}H_{2m'}$)—Am', in which Am' and the group of the formula —($C_{m'}H_{2m'}$)— have the previously-given meaning, and the acid addition salts, particularly the pharmaceutically acceptable acid addition salts, thereof. In the above compounds, the group of the formula —O—($C_{m'}H_{2m'}$)—Am' preferably substitutes the 4-position of the phenyl portion.

The above group of compounds is represented by those of the following formulae:

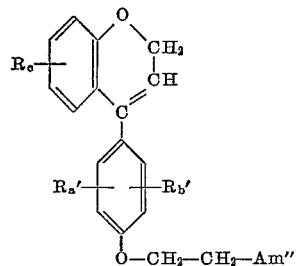

and

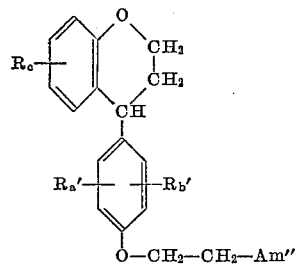

in which Am″ is N,N-di-lower alkyl-amino or N,N-alkylene-imino, in which alkylene has from four to seven carbon atoms, each of the groups $R_a'$ and $R_b'$ is hydrogen or the group of the formula —O—$CH_2CH_2$—Am″, in which Am″ has the previously-given meaning, and the group $R_c$ is hydrogen, lower alkyl, lower alkoxy or halogeno, or acid addition salts, particularly pharmaceutically acceptable acid addition salts, thereof.

The compounds of this invention are useful in the form of compositions suitable for enteral, e.g. oral, parenteral or topical use; essentially, they comprise a pharmacologically effective amount of one of the new compounds of this invention in admixture with a pharmaceutically acceptable, organic or inorganic, solid or liquid carrier, which usually represents the major portion by weight of such compositions. These preparations are in solid form, for example, as capsules, tablets, dragees and the like, in liquid form, for example, as solutions, suspensions and the like, or in the form of emulsions, e.g. salves, creams and the like. Suitable carrier materials are, for example, starches, e.g. corn starch, wheat starch and the like, sugars, e.g. lactose, sucrose and the like, stearic acid or salts thereof, e.g. magnesium stearate, calcium stearate and the like, water, benzyl alcohol, stearyl alcohol, talc, gums, acacia, tragacanth, polyalkylene glycols, propylene glycol and the like. The quantity and the nature of the carrier ingredients can vary widely and depend, inter alia, upon the desired physical appearance or size of the composition, method of manufacture and the like. Encapsulation may be effected by using, if desired, the same excipients as those for tablets. If necessary, the compositions may contain other auxiliary substances, such as preserving, stabilizing, wetting, emulsifying agents and the like, salts for varying the osmotic pressure, buffers, etc. They may also contain, in combination, other pharmacologically useful substances. The compounding of the formulations is generally carried out in the manner normally employed in the art, i.e. by manufacturing a mixture, a granulate and the like. Any compatible color, approved and certified under the provisions of the Federal Food, Drug and Cosmetic Law may be used for aesthetic purposes or as a means of identification.

The compounds of the present invention are prepared according to methods known per se; for example, they are formed by converting in a compound having one of the formulae

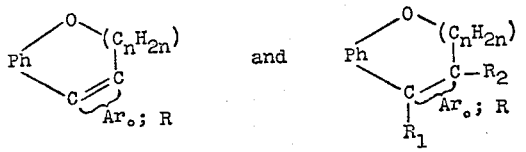

in which Ph, R, $R_1$, $R_2$ and the letter $n$ have the previously-given meaning, and Ar₀ is a monocyclic carbocyclic aryl group substituted by R₀ capable of being converted into N-substituted amino-lower alkoxy, in which N-substituted amino is separated from the oxygen by at least two carbon atoms, or a salt thereof, in the form of mixtures of isomers or single isomers, the monocyclic carbocyclic aryl group Ar₀ substituted by R₀ into the monocyclic carbocyclic aryl group Ar substituted by N-substituted amino-lower alkyl-oxy, and, if desired, converting a resulting salt into the free compound or into another salt, and/or, if desired, converting a resulting compound into an N-oxide or a quaternary ammonium compound thereof, and/or, if desired, converting a resulting compound or an N-oxide into a salt thereof, and/or, if desired, converting a quaternary ammonium compound into another quaternary ammonium compound, and/or, if desired, separating a mixture of isomers into the single isomers.

In the starting material, the group Ar₀ may have one or more than one group R₀, which is converted into N-substituted amino-lower alkyl-oxy in one step or in stages. A particularly suitable group R₀ is hydroxyl; its conversion into N-substituted amino-lower alkyl-oxy is carried out according to known procedures. Usually, the starting material, in which Ar₀ is substituted by hydroxyl representing R₀, or preferably a salt thereof, is reacted with a reactive ester of an N-substituted amino-lower alkanol, in which the N-substituted amino group, representing primarily an N,N-disubstituted amino group, is separated from hydroxyl by at least two carbon atoms, or a salt thereof, particularly a compound of the formula $$Am-(C_mH_{2m})-X$$

in which Am and the group of the formula $-(C_mH_{2m})-$  have the previously-given meaning, Am being primarily N,N-disubstituted amino, and X stands for a reactive esterified hydroxyl group. The latter is above all a hydroxyl group esterified with a strong mineral acid, such as a hydrohalic acid, e.g. hydrochloric, hydrobromic acid and the like; the group X represents primarily halogeno, e.g. chloro, bromo and the like. It may also be a hydroxyl group esterified with a strong organic sulfonic acid, such as a lower alkane sulfonic acid, e.g. methane sulfonic, ethane sulfonic acid and the like, or a monocyclic carbocyclic aryl-sulfonic acid, e.g. p-toluene sulfonic acid and the like; the group X may, therefore, also stand for lower alkyl-sulfonyloxy, e.g. methyl-sulfonyloxy, ethylsulfonyloxy and the like, or monocyclic carbocyclic aryl-sulfonyloxy, e.g. p-tolylsulfonyloxy and the like. The preferred reactive esters of an N-substituted amino-lower alkanol are those having the formula Am—$(C_mH_{2m})$—Hal, in which the group of the formula $-(C_mH_{2m})-$ has the previously-given meaning, Am is an N,N-disubstituted amino group, and Hal represents halogeno, particularly chloro.

As noted above, the starting material is preferably used in the form of a salt thereof. Such salt, for example, a metal salt, particularly an alkali metal salt, e.g. lithium, sodium, potassium and the like, salt, as well as an alkaline earth metal salt, or any other suitable salt, is formed, for example, by treatment of the starting material, in which the group Ar₀ is substituted by hydroxyl representing R₀, with a metal salt-forming reagent, such as an alkali metal hydride or an alkali metal amide, e.g. lithium hydride, sodium hydride, sodium amide, potassium amide and the like, or any other suitable reagent, such as an alkali metal lower alkoxide or alkaline earth metal lower alkoxide, e.g. lithium, sodium potassium or barium methoxide, ethoxide or tertiary butoxide and the like, or an alkali metal compound of a hydrocarbon, e.g. butyl lithium, phenyl lithium, phenyl sodium and the like. The preparation of the salt is usually carried out in the presence of an inert solvent, e.g. hexane, benzene, toluene, xylene, diethyl ether, p-dioxane, tetrahydrofuren, diethyleneglycol dimethylether, N,N-dimethylformamide and the like, or any other suitable solvent, such as a lower alkanol, e.g. methanol, ethanol and the like, or solvent mixture, if necessary, while cooling or at an elevated temperature, and/or in the atmosphere of an inert gas.

The reaction of the starting material, particularly a metal compound thereof, with the reactive ester of an N-substituted amino-lower alkanol is carried out in the presence of a suitable diluent, for example, in the solvent or solvent mixture used for the preparation of a metal compound, if necessary, while cooling or at an elevated temperature, and/or, in the atmosphere of an inert gas, e.g. nitrogen. Formation of the metal compound of the starting material may also be achieved in situ; for example, the free starting material and the reactive ester of the N-substituted amino-lower alkanol may be reacted in the presence of a salt-forming reagent.

Conversion of hydroxyl representing R₀ into N-substituted amino-lower alkyl-oxy may also be achieved by treating the starting material, in which Ar₀ is a monocyclic carbocyclic aryl radical substituted by hydroxyl representing R₀, with an N-substituted amino-lower alkanol, in which the N-substituted amino group, representing primarily an N,N-disubstituted amino group, is separated from the hydroxyl group by at least two carbon atoms, in the presence of a di-substituted carbonate. The latter is, for example, a di-aryl carbonate, e.g. diphenyl carbonate and the like, or, more particularly, a di-lower alkyl carbonate, e.g. dimethyl carbonate, ethyl methyl carbonate, diethyl carbonate, dibutyl carbonate and the like. The reaction is carried out at an elevated temperature, for example, between about 100° and about 210°, preferably between about 180° and about 200°, and, if desired, in the presence of a transesterification catalyst capable of enhancing the rate of the reaction, e.g. sodium, potassium, sodium carbonate, potassium carbonate, sodium aluminate and the like, a metal lower alkoxide, e.g. sodium ethoxide, titanium butoxide and the like, or any other analogous reagent. The reaction is usually performed in the absence of a solvent, an excess of the di-substituted carbonate serving at the diluent, but may also be carried out in the presence of an additional solvent or solvent mixture, if necessary, in a closed vessel and/or in the atmosphere of an inert gas, e.g. nitrogen and the like.

Another group R₀ capable of being converted into an N-substituted amino-lower alkoxy is the group of the formula —O—C(=O)—Y, in which Y represents halogeno or etherified hydroxyl. The group Y is particularly lower alkoxy, e.g. methoxy, ethoxy, n-butyloxy and the like, as well as phenyloxy or any other analogous etherified hydroxyl group, whereas halogeno, representing Y, is particularly chloro, as well as bromo and the like. Upon reacting, a starting material having a group Ar₀ substituted by the above group representing R₀ with an N-substituted amino-lower alkanol, in which N-substituted amino, representing primarily an N,N-disubstituted amino group, is separated from the hydroxyl group by at least two carbon atoms, the desired compound can be formed. The reaction is carried out under the previously-described conditions, i.e. at an elevated temperature, preferably at between 180° and 200°, and, if desired, in the presence of a transesterification reagent, such as one of those previously-described; the reaction is preferably carried out in the absence of a diluent, but may also be performed in the presence of a solvent or solvent mixture, if necessary, in the atmosphere of an inert gas, e.g. nitrogen.

A further group R₀ capable of being converted into N- substituted amino-lower alkoxy is also a reactive esterified hydroxy-lower alkyl-oxy group. The latter is particularly a group of the formula —O—($C_mH_{2m}$)—X, in which X and the group of the formula —($C_mH_{2m}$)— have the previously-given meaning. The reactive esterified hydroxyl group X is primarily a group Hal representing halogeno, particularly chloro; it may also be a suitable organic sulfonyloxy group, such as one of those mentioned above. A starting material having a group $Ar_◦$ substituted by reactive esterified hydroxy-lower alkyl-oxy representing $R_◦$ is reacted with an N-substituted amine, such as an N-monosubstituted or an N,N-disubstituted amine, having preferably the formula H—Am, in which Am has the above-given meaning, to yield the desired compound. The reaction is preferably carried out in such manner, that an excess of the amine or any other suitable, acid-neutralizing agent, e.g. potassium carbonate and the like, is used. If desired, the reaction mixture is diluted with a suitable inert solvent or solvent mixture; if necessary, the reaction is carried out while cooling or at an elevated temperature, and/or in the atmosphere of an inert gas, e.g. nitrogen, and/or in a closed vessel.

The starting materials used in the above reaction are prepared according to known methods. Thus, the starting materials of the formula

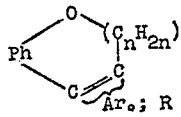

in which Ph, R and the letter $n$ have the previously-given meaning, and $Ar_◦$ is a monocyclic carbocyclic aryl radical substituted by hydroxyl representing the group $R_◦$, are obtained, for example, by reacting a compound having the formula:

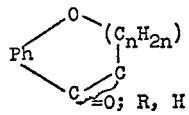

in which Ph, R and the letter $n$ have the previously-given meaning, with an organo-metallic reagent of the formula $M^⊕Ar_◦'^⊖$, in which $Ar_◦'$ is a monocyclic carbocyclic aryl radical substituted by $R_◦'$ capable of being converted into hydroxyl (particularly lower alkoxy, e.g. methoxy, ethoxy and the like, as well as a 1-phenyl-lower alkoxy group, e.g. benzyloxy, 1-phenylethyloxy and the like), and $M^⊕$ is the cation of certain metals of the I-A-group of the Periodic System (i.e. of certain alkali metals), e.g. lithium, sodium and the like, or the group of the formula Hal—$Mg^⊕$, in which Hal is halogeno, e.g. chloro, bromo, iodo and the like, if necessary, converting a resulting compound of the formula

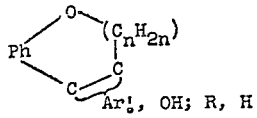

in which Ph, $Ar_◦'$, R and the letter $n$ have the previously-given meaning, into the unsaturated compound of the formula

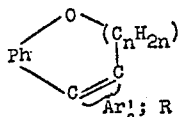

in which Ph, $Ar_◦'$, R and the letter $n$ have the previously-given meaning, and converting in the latter the group $Ar_◦'$ substituted by $R_◦'$ into the group $Ar_◦$ substituted by $R_◦$ representing hydrogen.

The reaction of the ketone intermediate with the organometallic reagent is carried out according to known methods. Usually, the reaction is carried out in the presence of a solvent or solvent mixture, if necessary, while cooling or at an elevated temperature, and/or in the atmosphere of an inert gas, e.g. nitrogen. Furthermore, the "Method of Entrainment," described by Kharash and Reinmuth, Grignard Reactions of Nonmetallic Substances (Prentice-Hall, 1954), or a cyclic reactor, as described by Lawesson, Acta Chim. Scand., vol. 12, p. 1 (1958), may have to be employed to bring about the formation of the Grignard reagent or the reaction of the latter with the ketone intermediate.

If necessary, the product resulting from the reaction of the ketone intermediate with the organo-metallic reagent has to be converted into the unsaturated intermediate. This is achieved, for example, by dehydration, if required, at an elevated temperature, and/or in the presence of an acidic reagent, such as an acid, e.g. hydrochloric, hydrobromic, sulfuric, acetic, p-toluene sulfonic acid and the like, as well as any other suitable acidic reagent, e.g. thionyl chloride, phosphorus pentachloride, ammonium chloride, acetyl chloride, p-toluene sulfonyl chloride, acetic anhydride, pyridine hydrochloride and the like, or a mixture thereof, which reagents may also be used in the presence of a solvent or solvent mixture. The formation of the unsaturated compound may also be accomplished, for example, by converting the hydroxyl group of the intermediate product into a reactive esterified hydroxyl group by esterification, for example, into an acyloxy group or into halogeno according to known methods, and then eliminating the elements of an acid, if necessary, at an elevated temperature, and/or, in the presence of a suitable base.

In a resulting compound, $R_◦'$ substituting $Ar_◦'$ is converted into hydroxyl, usually by acid hydrolysis with a suitable reagent, e.g. hydrobromic acid, aluminum chloride, pyridine hydrochloride and the like. A 1-phenyl-lower alkoxy group representing $R_◦'$ is converted into hydroxyl by hydrogenolysis with hydrogen in the presence of a suitable catalyst, e.g. a palladium catalyst and the like.

The starting materials of the formula

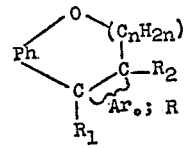

in which Ph, R, $R_1$, $R_2$ and the letter $n$ have the previously-given meaning, and $Ar_◦$ is a monocyclic carbocyclic aryl group substituted by hydroxyl representing $R_◦$, are obtained, for example, by reacting a compound having one of the formulae:

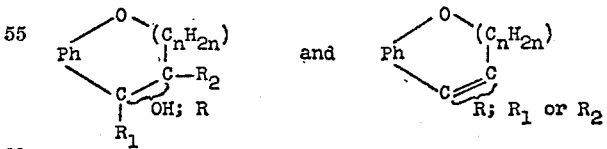

in which Ph, R, $R_1$, $R_2$ and the letter $n$ have the previously-given meaning, with a compound of the formula H—$Ar_◦$, in which $Ar_◦$ has the previously-given meaning, but is preferably a monocyclic carbocyclic aryl radical substituted by hydroxyl, in the presence of a suitable Lewis acid reagent, such as a strong inorganic acid, e.g. sulfuric acid and the like, or a Friedel-Crafts reagent, e.g. aluminum chloride and the like; this reaction is carried out according to known procedures.

In the starting materials resulting from the above procedures, in which $Ar_◦$ is substituted by hydroxyl, the latter may be converted into the group —O—C(=O)—Y, in which Y has the previously-given meaning, for example, according to any method suitable for the esterification of a phenolic hydroxyl group, such as formation of an alkali metal compound of the phenolic intermediate and reaction of the latter with an ester of the compound of the formula HO—C(=O)—Y, in which Y has the previously-given meaning.

In addition, R₀ substituting Ar₀ in a resulting starting material, whenever representing hydroxyl, may be converted into a reactive esterified hydroxyl-lower alkyl-oxy group by treating the starting material having a group Ar₀ substituted by hydroxyl, or a salt thereof, with a lower alkylene-oxide, a halogeno-lower alkanol in which halogeno is separated from hydroxyl by at least two carbon atoms, or with a lower alkylene halide, in which the two halogeno atoms are separated by at least two carbon atoms, for example, a chloro-lower alkyl bromide, in which chloro is separated from bromo by at least two carbon atoms, and, if necessary, converting in a resulting compound, in which Ar₀ is substituted by hydroxy-lower alkyl-oxy, hydroxyl into esterified hydroxyl according to known methods, for example, by treatment with a thionyl halide, e.g. thionyl chloride and the like, a phosphorus halide, e.g. phosphorus tribromide and the like, or with an organic sulfonic acid halide, e.g. chloride and the like, or any other suitable method.

The compounds of this invention having the following formula

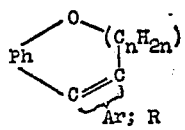

in which Ph, Ar, R and the letter $n$ have the previously-given meaning, are also obtained by reacting a compound of the formula

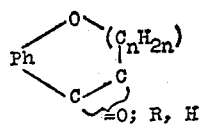

in which Ph, R and the letter $n$ have the previously-given meaning, are also obtained by reacting a compound of the formula Ar⊖ M⊕, in which M⊕ has the previously-given meaning, and Ar⊖ is the anion of a compound of the formula Ar—H, in which Ar has the previously-given meaning, and, if necessary, converting a resulting intermediate of the formula

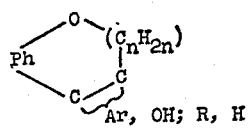

in which Ph, Ar, R and the letter $n$ have the previously-given meaning, into the desired unsaturated compound, and, if desired, carrying out the optional steps.

The above reaction is carried out according to known methods, preferably in the presence of a diluent. The cation M⊕ is more especially the cation of the formula ⊕Mg—Hal, in which Hal is halogeno, especially bromo. A Grignard reagent representing Hal—Mg⊕ Ar⊖ is prepared, for example, by reacting a compound of the formula Hal—Ar, in which Ar and Hal have the previously-given meaning, the latter being above all bromo, with magnesium in the presence of a suitable diluent, e.g. diethyl ether, tetrahydrofuran and the like, if necessary, by initiating the reaction with a suitable reagent, e.g. methyl iodide and the like. It is then treated with the starting material, if desired, after having replaced or diluted the solvent with another diluent, e.g. toluene, anisole and the like. The reaction is carried out while cooling or preferably at an elevated temperature, if necessary, in the atmosphere of an inert gas, e.g. nitrogen.

If necessary, a resulting hydroxyl intermediate has to be converted into the desired unsaturated compound according to the previously-described procedure, for example, by dehydration, conversion of the hydroxyl group into an esterified hydroxyl group and elimination of the elements of an acid, or any other appropriate procedure.

The starting materials used in the above procedure are known or may be prepared according to known methods.

The compounds of this invention having the following formula

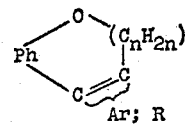

in which Ph, Ar, R and the letter $n$ have the previously-given meaning, may also be prepared, for example, by eliminating the elements of hydrohalic acid of the formula H—Hal from a compound of the formula

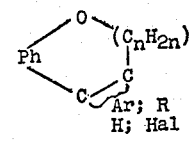

in which Ph, Ar, R and the letter $n$ have the previously-given meaning, and Hal stands for halogeno, especially chloro or bromo, and, if desired, carrying out the optional steps.

The elimination of hydrohalic acid from the starting material is carried out according to known methods, usually by treatment with a base, such as an alkali metal hydroxide, e.g. sodium hydroxide, potassium hydroxide and the like, or an organic base, e.g. pyridine, collidine, quinoline and the like. The reaction is usually performed in the presence of a diluent, such as a lower alkanol, or a mixture thereof, whereby a liquid organic base may simultaneously serve as a solvent, if necessary, at an elevated temperature, and/or, in the atmosphere of an inert gas, e.g. nitrogen.

The starting materials used in the above procedure are prepared according to known methods, preferably by reacting a compound of the formula

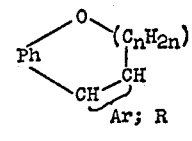

in which Ph, Ar, R and the letter $n$ have the previously-given meaning, and which is prepared according to the previously-described procedure, with a suitable halogenating reagent, particularly an N-halogeno-di-carboxylic acid imide, e.g. N-chloro-succinimide, N-bromo-succinimide, N-chloro-hydantoin and the like, in the presence of a suitable diluent, e.g. chloroform, methylene chloride, benzene and the like, if necessary, at an elevated temperature, or any other suitable procedure.

The compounds of this invention having the following formula

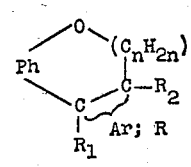

in which Ph, Ar, R, R₁, R₂ and the letter $n$ have the previously-given meaning, are also prepared by replacing in a compound of the formula

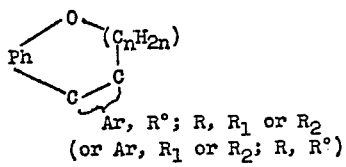
Ar, R°; R, R₁ or R₂
(or Ar, R₁ or R₂; R, R°)

in which Ph, Ar, R, R₁, R₂ and the letter $n$ have the previously-given meaning, and R° is hydroxyl or esterified hydroxyl, or a salt thereof, the group R° by hydrogen, and, if desired, carrying out the optional steps.

A hydroxyl group representing R° in the above starting material is preferably attached to the same carbon atom as the group Ar, especially, if the latter substitutes the carbon atom adjacent to the 1,2-phenylene radical; it may also be attached to the carbon atom carrying the group R. It is replaced according to known methods, for example, by treating the starting material or an acid addition salt thereof with hydrogen in the presence of a catalyst, e.g. a platinum catalyst (for example, in the presence of methanol), Raney nickel and the like, if necessary, at an increased pressure and/or at an elevated temperature. It may also be removed by chemical reduction, for example, by treatment with zinc in the presence of an acid, e.g. hydrochloric acid, acetic acid and the like, with a metal amalgam, e.g. sodium amalgam and the like, in the presence of a moist solvent, e.g. diethyl ether and the like, with a light metal hydride, e.g. lithium aluminum hydride in the presence of aluminum chloride and the like, or any other suitable method.

An esterified hydroxyl group representing R° is primarily halogeno (i.e. hydroxyl esterified with a hydrohalic acid), e.g. chloro, bromo and the like. It is removed either by catalytic hydrogenation or by chemical reduction, e.g. by treatment with zinc in the presence of an acid.

The starting materials used in the above reaction are prepared according to known methods, for example, by reacting a compound of the formula

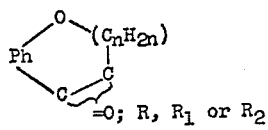
=O; R, R₁ or R₂ in which Ph, R, R₁, R₂ and the letter $n$ have the previously given meaning, with a Grignard reagent of the formula HalMg⊕[Ar]⊖, in which Ar has the previously-given meaning, and Hal is halogeno, e.g. chloro, bromo and the like, and carefully decomposing a resulting organometalic complex. The Grignard reaction is carried out as previously described; in a resulting starting material, the hydroxyl group may be converted into an esterified hydroxyl group, for example, into halogeno (for example, by treatment with a thionyl halide, e.g. thionyl chloride and the like, or a phosphorus halide, e.g. phosphorus bromide and the like).

The intermediates used in the above-described Grignard reaction for the preparation of the starting materials are known or may be prepared according to known methods.

Compounds of this invention having the following formula

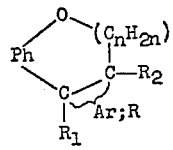

in which Ph, Ar, R and the letter $n$ have the previously-given meaning, and each of the groups R₁ and R₂ is hydrogen, may also be prepared by converting in a compound of the formula

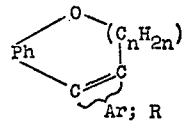

in which Ph, Ar, R and the latter $n$ have the previously-given meaning, or a salt thereof, the carbon-to-carbon double bond, the carbon atoms of which are substituted by Ar and R, into a carbon-to-carbon single bond, the carbon atoms of which are substituted by Ar and R, and, if desired, carrying out the optional steps.

The removal of the carbon-to-carbon double bond is carried out according to methods known per se, for example, by treatment with an alkali metal, e.g. sodium and the like, in the presence of a lower alkanol, with metal amalgam, e.g. sodium amalgam in the presence of a hydrogen donor, e.g. sodium amalgam in the presence of moist diethyl ether, catalytically activated hydrogen, such as hydrogen in the presence of a platinum catalyst and the like, or any other suitable method, such as those mentioned above.

The starting materials used in the above reaction are prepared, for example, according to the previously-described procedures.

A resulting salt is converted into the free base, for example, by treating it with an alkaline reagent, such as a metal hydroxide, e.g. lithium hydroxide, sodium hydroxide, potassium hydroxide, calcium hydroxide and the like, a metal carbonate, e.g. sodium, potassium or calcium carbonate or hydrogen carbonate and the like, ammonia and the like, or by treatment with a suitable hydroxyl ion exchange resin.

A resulting salt is converted into another salt according to known methods, for example, by treatment with an anion exchange preparation. An acid addition salt, particularly a salt with an inorganic acid, is also converted into another acid addition salt by reacting it with a suitable metal e.g. sodium, barium, silver and the like, salt of an acid, preferably in the presence of a diluent, in which a resulting inorganic salt is insoluble and is thus removed from the reaction.

A free base is converted into an acid addition salt thereof according to known methods, for example, by reacting it or a solution thereof in a suitable solvent or solvent mixture with the acid or a solution thereof, or with a suitable anion exchange preparation, and isolating the desired salt. A salt may be obtained in the form of a hydrate thereof or may include solvent of crystallization.

An N-oxide of a compound of this invention is prepared according to known methods, for example, by treating the free base with a suitable N-oxidizing reagent, such as hydrogen peroxide, ozone or a peracid, e.g. peracetic, perbenzoic, monoperphthalic, persulfuric acid and the like, in the presence of a suitable inert diluent. An N-oxide is converted into an acid addition salt thereof according to the above procedure.

Quaternary ammonium derivatives of the compounds of this invention are obtained according to known methods, for example, by reacting the base with the reactive ester of an alcohol and a strong acid, such as, for example, with one of the lower alkyl halides, di-lower alkyl sulfates, lower alkyl organic sulfonates, phenyl-lower alkyl halides described above. The quaternizing reaction is performed in the absence or presence of a solvent, while cooling or at an elevated temperature, if necessary, in a closed vessel and/or in the atmosphere of an inert gas, e.g. nitrogen and the like.

Resulting quaternary ammonium compounds may be converted into other quaternary ammonium compounds, such as the quaternary ammonium hydroxides, for example, by reacting a quaternary ammonium halide with silver oxide, or a quaternary ammonium sulfate with barium hydroxide, by treating a quaternary ammonium salt with a hydroxyl ion exchange preparation or any other suitable method. A quaternary ammonium hydroxide is converted into a quaternary ammonium salt by reacting the former with a suitable acid. A quaternary ammonium salt is also converted directly into another quaternary ammonium salt; for example, a quaternary ammonium iodide, when reacted with freshly prepared silver chloride or with hydrochloric acid in anhydrous methanol, yields the desired quaternary ammonium chloride, or a quaternary ammonium salt when treated with a suitable anion exchange preparation, can be converted into another quaternary ammonium salt. A quaternary ammonium compound may be obtained in the form of a hydrate thereof or may contain solvent of crystallization.

A mixture of resulting isomeric compounds may be separated into the single isomers. For example, a mixture of diastereoisomers or a mixture of geometric cis-trans isomers is separated into the individual racemic compounds on the basis of physico-chemical differences, such as solubility, for example, by fractional crystallization, as well as by fractional distillation and the like. Racemates are resolved into the optically active d- and l-forms according to known resolution procedures, for example, by forming a salt of the free racemic base with one of the optically active forms of an acid containing an asymmetric carbon atom. Especially useful as optically active forms of salt-forming acids having an asymmetric carbon atom are D-tartaric (l-tartaric) and L-tartaric (d-tartaric) acid, as well as the optically active forms of malic, mandelic, camphor 10-sulfonic, quinic acid and the like. A resulting mixture of salts of the optically active acid with the antipodes of the base racemate is separated into the single salts on the basis of physico-chemical differences, for example, by fractional crystallization. From a resulting salt, the free and optically active base is obtained according to the method described above, and a free and optically active base can be converted into its acid addition salt, N-oxide, salt of an N-oxide or quaternary ammonium compound according to the procedures described above.

The invention also comprises any modification of the process wherein a compound formed as an intermediate at any stage of the process, is used as the starting material and the remaining step(s) of the process is(are) carried out, as well as any new intermediates.

In the process of this invention such starting materials are preferably used which lead to final products mentioned in the beginning as preferred embodiments of the invention.

The following examples are intended to illustrate the invention and are not to be construed as being limitation thereon. Temperatures are given in degree centigrade.

*Example 1*

To 1.6 g. of dry magnesium turnings in an atmosphere of nitrogen are added 4 ml. of tetrahydrofuran and ten drops of methyl iodide; the mixture is stirred until it becomes turbid, and is then treated with ten drops of 4-bromo-anisole and 10 ml. of tetrahydrofuran. After refluxing for two hours, a solution of 18.2 g. of 4-(2-N,N-diethylaminoethyloxy)-bromobenzene in 200 ml. of tetrahydrofuran is added and refluxing is continued until all the magnesium has been consumed (about thirty minutes). To the resulting gray Grignard preparation is added a solution of 9.0 g. of chroman-4-one in 40 ml. of tetrahydrofuran. The refluxing reaction mixture turns from green to red-orange and is maintained under reflux for seventeen hours. After cooling, it is treated with 10 ml. of a saturated ammonium chloride solution in water, and the organic solvent is evaporated under reduced pressure.

The aqueous residue is extracted with diethyl ether, the combined organic extracts are washed with 2N hydrochloric acid, and the aqueous solution is basified with sodium hydroxide. The organic material is extracted with diethyl ether; the organic extract is dried and evaporated and the remaining oily residue is distilled. Fraction 1, collected at 67–70°/0.1 mm. is discarded; Fraction 2, collected at 185–193°/0.1 mm. represents the desired 4 - [4 - (2 - N,N - diethylaminoethyloxy) - phenyl] - 2H-chromene of the formula

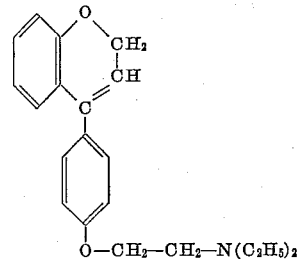

yield: 5.2 g.

It analyzes as follows: Calcd. for $C_{21}H_{25}NO_2$: C, 77.98; H, 7.79; N, 4.33. Found: C, 78.00; H, 8.00; N, 4.19.

*Example 2*

To a solution of the above 4-[4-(2-N,N-diethylaminoethyloxy)-phenyl]-2-H-chromene in diethyl ether is added a saturated solution of hydrogen chloride in diethyl ether. The desired 4-[4-(2-N,N-diethylaminoethyloxy)-phenyl]-2H-chromene hydrochloride crystallizes and is recrystallized from isopropanol, M.P. 182.5–183.5°.

It analyzes as follows: Calcd. for $C_{21}H_{26}ClNO_2$: C, 70.08; H, 7.28; N, 3.89. Found: C, 69.95; H, 7.37; N, 3.77.

By substituting in the above procedure picric acid for the hydrogen chloride, the 4-[4-(2-N,N-diethylaminoethyloxy)-phenyl]-2H-chromene picrate is obtained.

*Example 3*

Other compounds, which are prepared according to the above procedure by selecting the appropriate starting materials are, for example, 3 - [-(2 - N,N - diethylaminoethyloxy) - phenyl] - 6-methoxy-benzofuran, prepared by reacting 6-methoxy-2,3-dihydro-benzofuran-3-one with the Grignard reagent from 4-(2-N,N-diethylaminoethyloxy)-bromobenzene and magnesium;

6 - methoxy - 3 - {4 - [2 - (1 - pyrrolidino) - ethyloxy] - phenyl} - benzofuran, prepared by reacting 6-methoxy-2,3-dihydro-benzofuran-3-one with the Grignard reagent from 4-[2-(1-pyrrolidino) - ethyloxy] - bromobenzene and magnesium;

4-{4-[2-(1 - pyrrolidino) - ethyloxy] - phenyl} - 2H-chromene, prepared by reacting chroman-4-one with the Grignard reagent from 4-[2-(1-pyrrolidino)-ethyloxy]-bromobenzene and magnesium;

3 - methyl - 4 - {4 - [ - 2 - (1 - piperidino) - ethyloxy]-phenyl}-2H-chromene, prepared by reacting 3-methyl-chroman-4-one with the Grignard reagent from 4-[2-(1-piperidino)-ethyloxy]-bromobenzene and magnesium;

4 - [4 - (2 - N,N-dimethylaminoethyloxy) - phenyl]-2H-chromene, prepared by reacting chroman-4-one with the Grignard reagent from 4-(2-N,N-dimethylaminoethyloxy)-bromobenzene and magnesium;

4 - [2,3,4 - tri - (2 - N,N - diethylaminoethyloxy)-phenyl]-2H-chromene, prepared by reacting chroman-4-one with the Grignard reagent from 2,3,4-trimethoxy-bromobenzene, treating the resulting 4-(2,3,4-trimethoxy-phenyl)-2H-chromene with pyridine hydrochloride, and reacting the sodium salt of 4-(2,3,4-trihydroxy-phenyl)-2H-chromene with 2-N,N-diethylaminoethyl chloride;

4 - {4 - [2 - (4 - morpholino) - ethyloxy] - phenyl}-2H-chromene, prepared by reacting chroman-4-one with the Grignard reagent from 4-[2-(4-morpholino)-ethyloxy]-bromobenzene and magnesium;

7 - chloro - 4 - [3 - chloro - 4 - (2 - N,N-diethylaminoethyloxy)-phenyl]-2H-chromene, prepared by reacting 7-chloro-chroman-4-one with the Grignard reagent from 4-bromo-2-chloro-anisole and magnesium, hydrolizing the resulting 7-chloro - 4 - (4-methoxy-3-chloro-phenyl)-2H-chromene with pyridine hydrochloride to form the 7-chloro-4-(3-chloro-4-hydroxy-phenyl)-2H-chromene, the sodium salt of which is then reacted with 2-N,N-diethyl-aminoethyl chloride;

5,7 - dimethoxy - 4 - {4 - [2-(4-methyl-1-piperazino)-ethyloxyl-phenyl}-2H-chromene, prepared by reacting 5,7-dimethoxy-chroman-4-one with the Grignard reagent from 4 - [2 - (4 - methyl-1-piperazino)-ethyloxy]-bromobenzene and magnesium;

4 - [4 - (3-N,N-dimethylaminopropyloxy)-phenyl]-7-methyl-2H-chromene, prepared by reacting 7-methyl-chroman-4-one with the Grignard reagent from 4-(3-N,N-dimethylaminopropyloxy)-bromobenzene and magnesium;

3 - [4 - (2 - N,N-diethylaminoethyl)-oxy-phenyl]-2H-chromene, prepared by hydrolyzing 3 - (4 - methoxy-phenyl)-2H-chromene with pyridine hydrochloride, and treating the sodium salt of 3-(4-hydroxy-phenyl)-2H-chromene with 2-N,N-diethylaminoethyl chloride;

7 - methoxy - 4 - {4 - [2 - (1-pyrrolidino)-ethyloxy]-phenyl}-2H-chromene, prepared by reacting 7-methoxy-chroman-4-one with the Grignard reagent from 4-[2-(1-pyrrolidino)-ethyloxy]-oxy-bromobenzene and magnesium;

5 - [4 - (2-N,N-diethylaminoethyloxy)-phenyl]-2,3-dihydro-1-benzoxepin, prepared by reacting 2,3,4,5-tetrahydro-1-benzoxepin-5-one with the Grignard reagent from 4-(2-N,N-diethylaminoethyloxy)-bromobenzene and magnesium;

3 - [4 - (2-N,N-diethylaminoethyloxy)-oxy-phenyl]-6-methoxy-2,3-dihydro-benzofuran, prepared by reacting 6-methoxy-2,3-dihydro-benzofuran-3-ol with phenol in the presence of aluminum chloride, and treating the sodium salt of the resulting 3-(4-hydroxy-phenyl)-6-methoxy-2,3-dihydro-benzofuran with 2-N,N-diethylaminoethyl chloride;

6 - methoxy - 3 - {4 - [2 - (1-pyrrolidino)-ethyloxy]-phenyl}-2,3-dihydro-benzofuran, prepared by reacting the sodium salt of 3-(4-hydroxy-phenyl)-6-methoxy-2,3-dihydro-benzofuran with 1-(2-chloroethyl)-pyrrolidine;

4 - [4 - (2-N,N-diethylaminoethyloxy)-phenyl]-chroman, prepared by reacting chroman-4-ol with phenol in the presence of aluminum chloride, and treating the sodium salt of the resulting 4-(4-hydroxy-phenyl)-chroman with 2-N,N-diethylaminoethyl chloride;

4 - {4 - [2-(1-piperidino)-ethyloxy]-phenyl}-chroman, prepared by reacting the sodium salt of 4-(4-hydroxy-phenyl)-chroman with 1-(2-chloroethyl)-piperidine;

4 - [4 - (2-N,N-dimethylaminoethyloxy)-phenyl]-chroman, prepared by reacting the sodium salt of 4-(4-hydroxy-phenyl)-chroman with 2-N,N-dimethylaminoethyl chloride;

4 - {4 - [2-(1-pyrrolidino)-ethyloxy]-phenyl}-chroman, prepared by reacting the sodium salt of 4-(4-hydroxy-phenyl)-chroman with 1-(2-chloroethyl)-pyrrolidine;

4 - [2,3,4 - tri-(2-N,N-diethylaminoethyloxy)-phenyl]-chroman, prepared by reacting chroman-4-ol with pyrogallol in the presence of concentrated sulfuric acid and reacting the sodium salt of the resulting 4-(2,3,4-trihydroxy-phenyl)-chroman with 2 - N,N-diethylaminoethyl chloride;

3 - methyl - 4-{4-[2-(4-morpholino)-ethyloxy]-phenyl}-chroman, prepared by reacting 3-methyl-chroman-4-ol with phenol in the presence of aluminum chloride, and reacting the sodium salt of 4-(4-hydroxy-phenyl)-3-methyl-chroman with 4-(2-chloroethyl)-morpholine;

4 - [4 - (2 - N,N - diethylaminoethyloxy)-phenyl]-7-methoxy-chroman, prepared by reacting 7-methoxy-chroman-4-ol with phenol in the presence of aluminum chloride and treating the sodium salt of the resulting 4-(4-hydroxy-phenyl)-7-methoxy-chroman with 2-N,N-diethylaminoethyl chloride;

7 - chloro - 4-[3-chloro-4-(2-N,N-diethylaminoethyloxy)-oxy-phenyl]-chroman, prepared by reacting 7-chloro-chroman-4-ol with o-chlorophenol in the presence of aluminum chloride, and treating the sodium salt of the resulting 7 - chloro-4-(3-chloro-4-hydroxy-phenyl)-chroman with 2-N,N-diethylaminoethyl chloride;

5,7 - dimethoxy - 4 - {4-[2-(4-methyl-1-piperazino)-ethyloxy]-phenyl}-chroman, prepared by reacting 5,7-dimethoxy-chroman-4-ol with phenol in the presence of aluminum chloride, and treating the sodium salt of the resulting 5,7 - dimethoxy-4-(4-hydroxy-phenyl)-chroman with 1-(2-chloro-ethyl)-4-methyl-piperazine;

4 - [4 - (3-N,N-dimethylaminopropyloxy)-phenyl]-7-methyl-chroman, prepared by reacting 7-methyl-chroman-4-ol with phenol in the presence of aluminum chloride, and treating the sodium salt of the resulting 4-(4-hydroxy-phenyl)-7-methyl-chroman with 3-N,N-dimethylamino-propyl chloride;

3 - [4 - (2-N,N-diethylaminoethyloxy)-phenyl]-chroman, prepared by reacting 3-(4-methoxy-phenyl)-chroman with pyridine hydrochloride, and treating the sodium salt of 3-(4-hydroxy-phenyl)-chroman with 2-N,N-diethylaminoethyl chloride;

5 - [4 - (2-N,N-diethylaminoethyloxy)-oxy-phenyl]-2,3,4,5-tetrahydro-1-benzoxepin, prepared by reacting 2,3,4,5-tetrahydro-1-benzoxepin-5-ol with phenol in the presence of aluminum chloride, and treating the sodium salt of the resulting 5-(4-hydroxy-phenyl)-2,3,4,5-tetrahydro-1-benzoxepin with 2-N,N-diethylaminoethyl chloride and the like.

What is claimed is:
1. A member selected from the group consisting of the compound of the formula

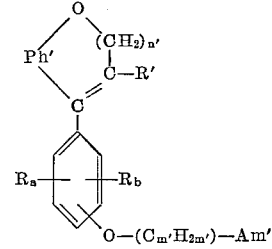

in which Ph' is a member selected from the group consisting of 1,2-phenylene, (lower alkyl)-1,2-phenylene, (lower alkoxy)-1,2-phenylene, and (halogeno)-1,2-phenylene, R' is a member selected from the group consisting of hydrogen and lower alkyl, the letter $n'$ is an integer from 0 to 2, Am' is a member selected from the group consisting of N,N-di-lower alkyl-amino, N,N-alkylene-imino, in which alkylene has from four to seven carbon atoms, 4-morpholino and 4-lower alkyl-1-piperazino, the group of the formula —$(C_{m'}H_{2m'})$— stands for alkylene having from two to three carbon atoms and separates the group Am' from the oxygen atom by two to three carbon atoms, and each of the groups $R_a$ and $R_b$ is a member selected from the group consisting of hydrogen, halogeno and the group of the formula —O—$(C_{m'}H_{2m'})$—Am', in which Am' and the group of the formula

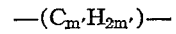

have the previously-given meaning, and a pharmaceutically acceptable acid addition salt thereof.

2. A member selected from the group consisting of the compound of the formula

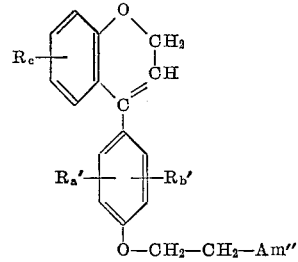

in which Am″ is a member selected from the group consisting of N,N-di-lower alkyl-amino and N,N-alkyleneimino, in which alkylene has from four to seven carbon atoms, each of the groups $R_a'$ and $R_b'$ is a member selected from the group consisting of hydrogen and the group of the formula —O—$CH_2$—$CH_2$—Am″, in which Am″ has the previously-given meaning, and the group $R_c$ is a member selected from the group consisting of hydrogen, lower alkyl, lower alkoxy and halogeno, and a pharmaceutically acceptable acid addition salt thereof.

3. A member selected from the group consisting of the 4-[4-(2-N,N-diethylaminoethyl)-oxyphenyl]-2H-chromene, and a pharmaceutically acceptable acid addition salt thereof.

4. A member selected from the group consisting of the compound of the formula

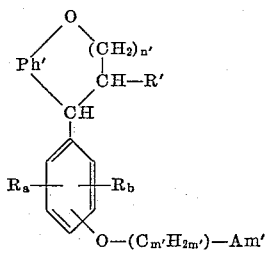

in which Ph′ is a member selected from the group consisting of 1,2-phenylene, (lower alkyl)-1,2-phenylene, (lower alkoxy)-1,2-phenylene and (halogeno)-1,2-phenylene, R′ is a member selected from the group consisting of hydrogen and lower alkyl, the letter $n'$ stands for an integer from 0 to 2, Am′ is a member selected from the group consisting of N,N-di-lower alkylamino, N,N-alkylene-imino, in which alkylene has from four to seven carbon atoms, 4-morpholino and 4-lower alkyl-1-piperazino, the group of the formula —$(C_{m'}H_{2m'})$— stands for alkylene having from two to three carbon atoms, and separates the group Am′ from the oxygen by two to three carbon atoms, and each of the groups $R_a$ and $R_b$ is a member selected from the group consisting of hydrogen, halogeno and the group of the formula —O—$(C_{m'}H_{2m'})$—Am′

in which Am′ and the group of the formula

—$(C_{m'}H_{2m'})$— have the previously-given meaning, and a pharmaceutically acceptable acid addition salt thereof.

5. A member selected from the group consisting of the compound of the formula

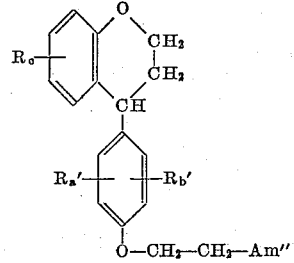

in which Am″ is a member selected from the group consisting of N,N-di-lower alkyl-amino and N,N-alkyleneimino, in which alkylene has from four to seven carbon atoms, each of the groups $R_a'$ and $R_b'$ is a member selected from the group consisting of hydrogen and the group of the formula —O—$CH_2$—$CH_2$—Am″, in which Am″ has the previously-given meaning, and the group $R_c$ is a member selected from the group consisting of hydrogen, lower alkyl, lower alkoxy and halogeno, and a pharmaceutically acceptable acid addition salt thereof.

References Cited

UNITED STATES PATENTS

| | | | |
|---|---|---|---|
| 2,636,885 | 4/1953 | Wynn et al. | 260—346.2 |
| 3,012,042 | 12/1961 | Hoi et al. | 260—346.2 |
| 3,226,402 | 12/1965 | Schoetensack | 260—346.2 |

OTHER REFERENCES

Lowenbein et al.: Chemical Abstracts: 19, pp. 286–8 (1925), QD1A51.

Allen et al.: Chemical Abstracts: 46, col. 1536 (f).

WALTER A. MODANCE, *Primary Examiner.*

JOHN M. FORD, *Assistant Examiner.*